J. H. FREETO.
Coffee Pot.
No. 23,021.
Patented Feb. 22, 1859.
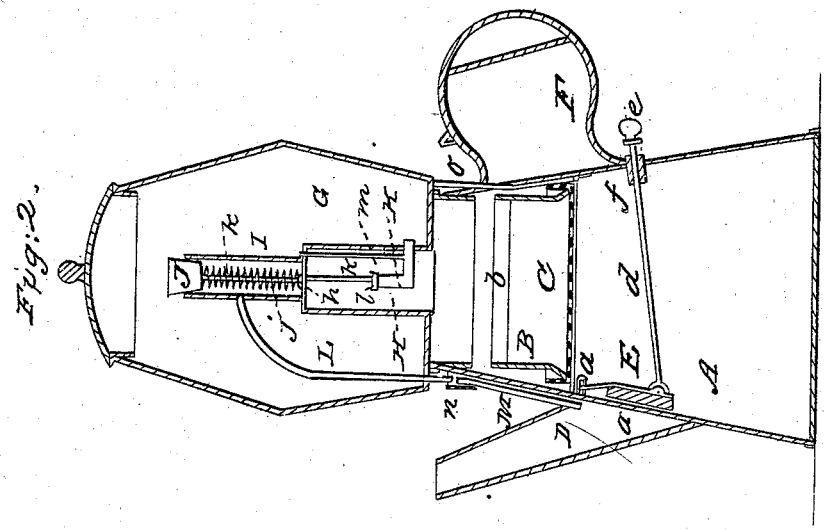
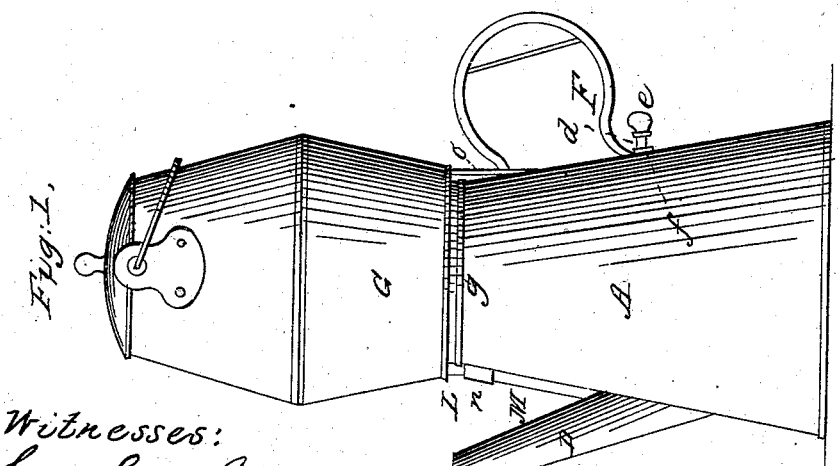

UNITED STATES PATENT OFFICE.

JAMES H. FREETO, OF WHEATON, ILLINOIS.

COFFEE-POT.

Specification of Letters Patent No. 23,021, dated February 22, 1859.

*To all whom it may concern:*

Be it known that I, JAMES H. FREETO, of Wheaton, in the county of Du Page and State of Illinois, have invented a new and Improved Coffee-Pot; and I do hereby declare that the following is a full, clear, and exact description of the same, reference being had to the annexed drawings, making a part of this specification, in which—

Figure 1, represents an elevation of my coffee pot. Fig. 2, a vertical central section of the same.

Similar letters of reference indicate corresponding parts in the two figures.

The object of this invention is to preserve the flavor of the coffee, a great portion of which escapes otherwise with the steam which rises when hot water is poured over the ground coffee, and the invention consists in arranging two valves in connection with suitable pipes in a condensing vessel which is placed in a cistern containing cold water in such a manner that the steam which rises from the hot coffee is condensed and carried back to the pot under all circumstances, so that the flavor of the coffee is perfectly preserved.

To enable others skilled in the art to fully understand and construct my invention, I will proceed to describe it.

A, is a coffee pot, the outward shape of which resembles a common pot for the same purpose, and B, is a hoop which fits into the upper part of the pot A, and which rests on a ring $a$, which is attached to the sides of the pot. This hoop is provided with a cross bar $b$, which serves as a handle to take the same out and put it in, and it (the hoop) serves to hold the strainer C, in its place. This strainer is made of linen, cloth or other suitable material and it is bent over the under edge of the hoop B, and forced down on the ring $a$, as represented in Fig. 2.

D, is the spout which communicates with the pot by an opening $c$, which is closed by a flap valve E, which is operated by means of a rod $d$, which extends to the outside of the pot under the handle F, where a knob $e$, is attached to its outer end so that it can be operated with the same hand which holds the pot. The rod $d$, passes through a stuffing box $f$, which is fitted into the side of the box in order to make a tight joint at the place where the rod passes. A small pipe $o$, admits air into the pot in order to get the necessary pressure to make the liquid flow from the spout if the valve E, be opened and the pot be closed.

G, is a cistern which fits over the coffee pot and a gasket $g$, is placed over the top edge of the pot so that the cistern closes down on the same hermetically. To the bottom of this cistern is attached the condensing chamber H, which is open at the bottom and which connects with a tube I, by means of an opening $h$, in its top. The opening $h$, is closed by a valve $i$, which is pressed down by a spiral spring $j$, which is attached to the stopper J, by which the tube I, is closed. The stem $k$, of the valve $i$, extends up and down and a valve $l$, is attached to its lower end which closes the opening of a pipe K, which communicates with the cistern. A rod $m$, serves to steady the pipe K, in its position. The tube I, communicates with the spout D, by means of a small pipe L, which extends through the bottom of the cistern G, to a socket $n$, from which another pipe M, leads to the spout.

The operation is as follows: The ground coffee is placed in the strainer and hot water is poured over it, and the pot is closed by placing the cistern over it. The latter vessel is filled with cold water and the steam rising from the hot coffee in the pot enters the condensing chamber H, where it is condensed by coming in contact with the cold sides of the same. Should the steam, however, form quicker than it is condensed by the chamber H, the valve $i$, is forced up by the pressure of the steam and the valve $l$, is lifted from the opening of the pipe K, so that a jet of cold water from the cistern is introduced into the chamber H, which condenses the steam contained therein at once, and the steam which has escaped by the valve $i$, is carried through the pipe L, down to the spout, and in passing through this pipe, which passes through the cold water in the cistern, the steam is condensed, so that it is deposited in a liquid form in the inner end of the spout where it mixes with the coffee as soon as the flap valve E is opened. By these means the flavor of the coffee, which would otherwise escape with the steam rising from the same, is fully preserved.

Having thus described my invention, what I claim as new and desire to secure by Letters Patent, is:—

1. The arrangement of valves $i$, and $l$, in the condensing chamber H, in connection with the pipes L, and K, whereby the steam which escapes through the valve $i$, is carried off and deposited in a liquid state into the spout, while at the same time, by the action of the steam, a jet of cold water is admitted into the chamber H, substantially as and for the purposes specified.

2. And I also claim: closing the opening $c$, through which the spout D, communicates with the coffee pot A, by means of a flap valve E, which is operated by a rod $d$, when the same is applied to a coffee pot which is hermetically closed by a gasket $g$, in connection with the air-tube $o$, substantially as and for the purpose specified.

JAS. H. FREETO.

Witnesses:
JOHN SUTCLIFFE,
R. K. NORTHAM.